(12) United States Patent
Larson

(10) Patent No.: US 6,412,864 B1
(45) Date of Patent: Jul. 2, 2002

(54) SIDE FACING MULTI-PASSENGER DIVAN ASSEMBLY

(75) Inventor: Mark W. Larson, Torrington, CT (US)

(73) Assignee: BE Aerospace, Inc., Wellington, FL (US)

( * ) Notice: Subject to any disclaimer, the term of this patent is extended or adjusted under 35 U.S.C. 154(b) by 0 days.

(21) Appl. No.: 09/523,161

(22) Filed: Mar. 10, 2000

(51) Int. Cl.[7] ............................................... B64D 11/06
(52) U.S. Cl. ................................ 297/216.2; 244/122 R
(58) Field of Search ........................... 297/216.1, 216.2, 297/216.19, 232; 244/122 R

(56) References Cited

U.S. PATENT DOCUMENTS

| | | | | |
|---|---|---|---|---|
| 2,682,931 A | * | 7/1954 | Young | 297/216.2 X |
| 2,933,127 A | * | 4/1960 | Brewster | 297/216.2 |
| 3,316,013 A | * | 4/1967 | Abel et al. | 297/232 X |
| 3,524,678 A | * | 8/1970 | Lavenne | 297/216.2 |
| 5,284,379 A | * | 2/1994 | Arnold et al. | 297/232 X |
| 5,509,722 A | * | 4/1996 | Beroth | 297/232 X |
| 5,657,950 A | * | 8/1997 | Han et al. | 297/216.2 X |
| 6,123,388 A | * | 9/2000 | Vits et al. | 297/483 X |

* cited by examiner

Primary Examiner—Peter R. Brown
(74) Attorney, Agent, or Firm—Gardner Carton & Douglas

(57) ABSTRACT

A side facing, multi-passenger aircraft divan assembly having a seat pan support assembly, with a front end, a rear end, a first side and a second side, and defining at least two passenger seating zones, a seat back assembly operatively coupled to the seat pan support assembly, and a base assembly extending downwardly from the seat pan support assembly into secure engagement with an underlying support surface of the aircraft. The adjacent passenger seating zones are spaced 27 inches from mid point to mid point of one another so as to prevent hazardous contact between passengers disposed in adjacent passenger seating zones during a longitudinally directed impact on the divan assembly. Furthermore, the base assembly also includes at least a forward support member and a rear support member extending downwardly from the seat pan support assembly, and a cross support assembly extending generally from the forward support member to the rear support member and structured to selectively resist compression of the forward and rear support members towards one another and to permit expansion of the forward and rear support members away from one another.

29 Claims, 2 Drawing Sheets

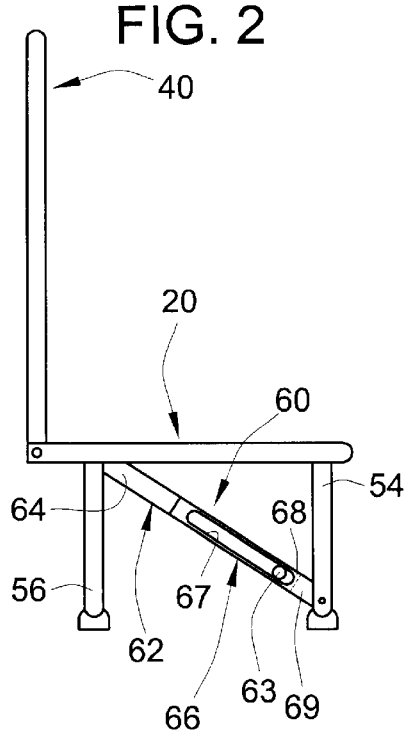
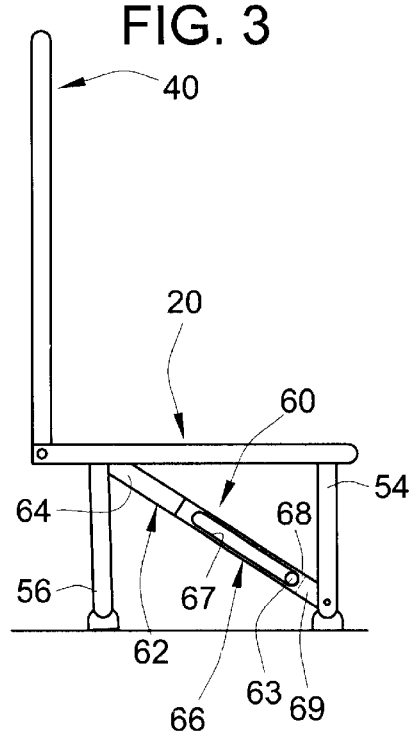
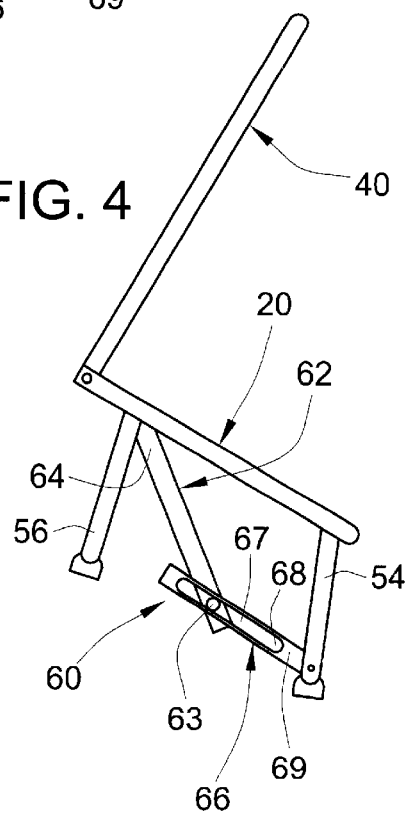

SIDE FACING MULTI-PASSENGER DIVAN ASSEMBLY

BACKGROUND OF THE INVENTION

1. Field of the Invention

The present invention relates to a side facing, multi-passenger divan assembly to be installed within an aircraft so as to provide for the comfortable seating of two or more passengers. More in particular, the divan assembly of the present invention is configured to achieve a substantially strong yet lightweight assembly, and to meet the stringent safety and impact requirements for aircraft use set forth by the Federal Aviation Association (FAA), which are enforced utilizing a variety of specialized test procedures and criteria.

2. Description of the Related Art

In the field of art relating to aircraft interiors, and in particular, to custom aircraft seating, seating devices referred to as divans are typically employed to accommodate one or more passengers within the aircraft. Specifically, divans are generally couch-like structures whereby one or more passengers can comfortably sit in a less formal, customized environment different from that typically utilized in commercial, passenger aircraft. Moreover, as divans are typically installed within private jets and aircraft having a customized aircraft interior, the orientation of the divan within the aircraft can often vary, with many divans being installed in a side facing orientation.

Despite the extensive customization available for aircraft interiors, including the varied use of seating structures such as divans, to develop a relaxed, attractive and/or functional environment, all articles used within aircraft interiors must still qualify as airworthy pursuant to the uniform regulations of the FAA. As a result, each installed article must undergo extensive FAA certifications and testing before they are authorized for utilization on an aircraft. To this end, the FAA is continuously updating and/or enhancing its test procedures directed towards newly installed components, often increasing the required criteria for passing a test to well above those levels set for prior devices.

Along these lines, two significant test procedures which divans, and in particular side facing divans, must undergo and pass, either independently or simultaneously, include: (i) the "pitch and roll deformation" test, wherein the divan must not fail under certain specified pitch and roll conditions, and (ii) the "longitudinal impact" test, wherein passenger to passenger contact must be avoided upon the exertion of a longitudinal force on the divan. Indeed, these test procedures, as well as the many others, are continuously being updated, with the criteria required for passing the tests being continuously increased. As a result, it is becoming more and more difficult to provide a lightweight divan assembly which meets of all of the requirements of comfort, size and convenience, but which also passes all of the test criteria. Moreover, as the test procedures are generally defined independently from one another, in most instances a manufacturer seeking to develop a new seating design cannot merely develop a new seat design in response to only one test procedure and criteria of particular importance, but rather must take all test procedures and criteria into account in every new design. This is primarily because, in many instances, modifications designed to make an assembly pass with respect to one set of test criteria, will often result in failure as to other test criteria that had previously been passed by the basic design.

Looking in particular to the requirements associated with passing the longitudinal impact test and avoiding passenger to passenger contact, this test generally involves the positioning of a corresponding number of passenger-like models on a divan assembly in an appropriate seating location (i.e. two passenger models for a two passenger divan). The divan assembly is then propelled longitudinally towards a rigid stop, thereby resulting in the longitudinal impact and subjecting the divan assembly and the passenger models thereon to a longitudinal force. During such a test procedure, the responses of the passenger models are studied in order to identify the extent of contact between adjacently positioned passengers, ensuring that nothing more than incidental contact takes place. For example, in the most traditional divan assemblies, an arm rest structure is typically positioned and independently secured to the aircraft at opposite ends thereof. As a result, when the impact force is exerted on the divan assembly, the passenger model closest to the side of impact will generally be driven into the arm rest, which serves to restrain the forward motion of that passenger. The adjacent passenger model, however, is driven towards the first passenger model and as there is no intervening arm rest to restrain its forward motion, significant injuries could result to both passenger models. As a result, in order to pass the required FAA test criteria, it is necessary to provide a divan assembly which can effectively avoid anything more than incidental contact between the adjacent passenger models, while also taking into account other practical consideration, such as size and weight.

Accordingly, it would be highly beneficial to provide a side facing, multi-passenger divan assembly which is configured so as to minimize and/or completely avoid contact between adjacent passengers during an FAA longitudinal impact test, thereby passing the FAA test criteria. Still, however, it would also be beneficial to provide such an assembly which is not substantially oversized, so as to dramatically increase the overall weight thereof, which would make it impractical for use with the intended number of passengers and which would make the assembly more vulnerable to failure with regard to other test procedures. As can be appreciated in all aircraft, weight and sizing is of critical importance, as the aircraft cabin has limited dimensions and the weight thereof can directly impact the operation of the aircraft, including economic variables such as fuel consumption.

Looking to the second of the many FAA test procedures used at least for side facing divan type assemblies, namely the pitch and roll deformation test, the FAA test criteria required for passage of this test are directed particularly towards applying stresses to the divan assembly itself in order to determine its susceptibility to breaking and/or other failures under certain conditions. To this end, the pitch and roll test procedure typically required by the FAA involves the simultaneous deflection of a portion of the divan assembly to a predetermined pitch angle, along with the application of a predetermined amount of roll to another portion of the divan assembly. For example, in the currently utilized FAA test procedures for a side facing divan, the front end of the divan assembly is subjected to a 10 degree pitch deformation between a first and a second side thereof. Simultaneously, the rear portion of the divan assembly is subjected to a 10 degree roll. Moreover, in some instances, the deformed divan assembly may be subjected to an impact force.

To compound the difficulty of the above-described test procedures, the tests are conducted relative to the weakest configuration of the divan assembly, that is, to the "worst case scenario." As a result, if the divan assembly is re-enforced merely so that it meets the required test criteria when positioned in a certain orientation, the FAA requirements necessitate that further testing be performed from a different orientation which has become the weakest configuration. Accordingly, the rigorous test requirements necessitate that the divan assembly be made to pass the FAA test criteria regardless of the orientation in which the divan assembly is positioned.

Again looking in detail to the pitch and roll deformation test, the primary purposes of such a test is to ensure that the components of the divan assembly do not fail, such as through breakage or other gross deformations defined by the FAA. As a result, this test procedure necessitates that the manufacturer sufficiently strengthen the divan assembly, while still taking into account the size and weight requirements generally associated with aircraft equipment. Therefore, it would be beneficial to provide a side facing divan assembly which is able to sufficiently meet test criteria associated with the pitch and roll deformation test, regardless of an installation orientation, while still maintaining optimal size and weight characteristics.

Because of the severity of the described test procedures, presently in the art many custom component manufacturers have turned to the utilization of traditional single passenger chair type devices, which independently meet the FAA test criteria, arranged in a side by side orientation so as to provide a multi-passenger divan assembly. Naturally, such side by side positioning of a plurality of single passenger divan assemblies is not desired, as the individual re-enforced designs are typically heavier than necessary and lead to an overall larger and heavier multi-passenger divan assembly than is optimal or desired. In addition, the storage space available underneath divan assemblies that are formed from a plurality of single passenger aircraft seats is limited as it is interrupted by a plurality of legs, and for instance is, therefore, not capable of stowing a life raft as would be another type of divan assembly. Accordingly, it would be highly beneficial to provide a multi passenger, side facing divan assembly which is capable of passing all of the many stringent FAA test procedures, while also minimizing the overall dimension and weight characteristics thereof and preserving the storage space available underneath the assembly.

SUMMARY OF THE INVENTION

The present invention is directed to a side facing, multi-passenger divan assembly for an aircraft, and preferably, for custom installation in an aircraft. In particular, the divan assembly includes a seat pan support assembly, which preferably defines the primary seating surface on which passengers will sit. Moreover, the seat pan support assembly preferably includes a front end, a rear end, a first side, and a second side, and defines a plurality of passenger seating zones. The specific number of passenger seating zones corresponds the number of passengers which the divan assembly is intended to accommodate safely. Also preferably, the spacing between adjacent passenger seating zones is generally at least about 27 inches from center to center of the adjacent passenger seating zones. Such a preferred spacing functions to reduce the likelihood of passenger to passenger contact upon a longitudinally directed impact force being exerted on the divan assembly.

The divan assembly further includes a seat back assembly. The seat back assembly is operatively coupled with the seat pan support assembly, and preferably extends generally vertically upward therefrom. As a result, the seat back assembly provides a comfortable backrest for passengers seated within the respective passenger seating zones, and can also be configured to further contribute to the minimization of passenger to passenger contact under an impact.

Extending downwardly from the seat pan support assembly into secure engagement with an underlying support surface of the aircraft is a base assembly. In particular, the base assembly is preferably secured to a seat track structure, conventionally secured to the support surfaces of the aircraft, in order to provide for a fixed, stable mounting of the divan assembly with the underlying support surface. The base assembly itself preferably includes at least two forward support members disposed on opposite longitudinal sides of the divan assembly, generally at the front end thereof. Likewise, the base assembly also preferably includes at least two rear support members extending downwardly from opposite sides of the seat pan assembly, at generally the rear end of the divan assembly. As a result, a first forward support member and a first rear support member are disposed a spaced apart distance from one another at generally the first side of the seat pan support assembly, while a second forward support member and a second rear support member are disposed a spaced apart distance from one another at generally the second side of the seat pan support assembly.

Extending generally from each forward support member towards the corresponding rear support member is a cross support assembly. The cross support assembly is particularly structured so as to resist compression of the forward support members and the rear support members towards one another, such as during the previously described, FAA pitch and roll deformation test. For example, during a conventional pitch and roll deformation test, one side of the divan assembly will tend to be deformed such that the forward and rear support members tend to compress and/or move towards one another, while at the opposite side of the divan assembly the forward and rear support members tend to expand and/or become more spaced apart relative to one another. Accordingly, during the test procedure, the cross support assemblies of the present invention respond to the forces exerted thereon, resisting compression of the forward and rear support members towards one another, when applicable, and permitting generally free expansion of the forward and rear support members away from one another, when applicable.

As such, the cross support assembly reinforces and strengthens the side of the divan assembly which is being compressed so as to prevent buckling and/or breakage of the structure. Conversely, on a side of the divan assembly wherein the expansion takes place, the cross support assembly allows the generally free expansion, thereby preventing the cross support assembly from working independently to resist the expansion, which would make it more susceptible to breakage and/or detachment from the individual support members. This is especially beneficial in the case of a more elongate multi-passenger divan assembly, as the extent of the deflection is greater under a normal pitch angle, and a substantial expansion is exhibited.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2 is a plan view of a side of the divan assembly in an unstressed position.

FIG. 3 is a plan view of a side of the divan assembly in a generally compressed orientation during a pitch and roll test procedure.

FIG. 4 is a plan view of a side of the divan assembly in an expanded orientation during the pitch and roll test procedure.

Like reference numerals refer to like parts throughout the several views of the drawings.

DETAILED DESCRIPTION OF THE PREFERRED EMBODIMENT

Figure 1:
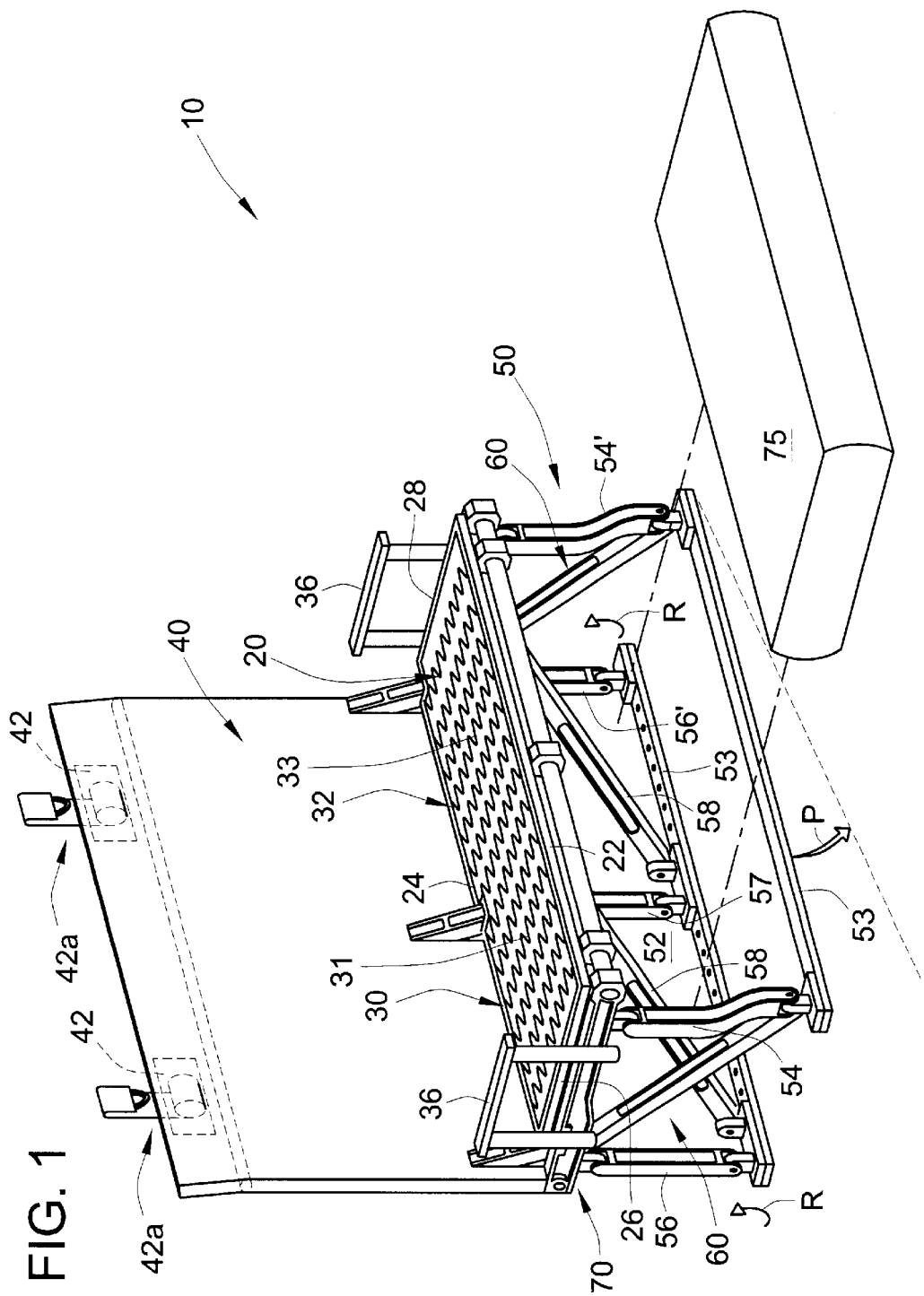
FIG. 1 is a perspective view of the side facing, multi-passenger divan assembly of the present invention.

The present invention is directed generally towards a side facing, multi-passenger divan assembly, generally indicated as 10 in FIG. 1. In particular, the divan assembly is structured to be positioned within an aircraft and secured to an underlying support surface, such as the floor of the aircraft and/or preferably, to inboard and outboard seating tracks 53 that are typically mounted on the underlying support surface of the aircraft. Moreover, the divan assembly 10 of the present invention is preferably configured to accommodate two or more passengers in a safe and comfortable manner, and in various custom orientations, including a side facing orientation confronting generally either a left side or right side of the aircraft.

Turning specifically to the illustrated divan assembly 10 of the present invention, it includes a seat pan support assembly, generally 20. The seat pan support assembly 20 preferably defines the portion of the divan assembly 10 on which a passenger will sit. As a result, depending upon the desired and intended number of passengers which the divan assembly 10 is configured to accommodate, the seat pan support assembly 20 of the present invention preferably includes at least two passengers seating zones 30 and 32, as shown in FIG. 1, each of which is designed to safely accommodate one passenger. Of course, although it is understood that more than the intended number of passengers may ultimately fit on a particular divan assembly, such as in casual, in-flight situations, the divan assembly 10 of the present invention is preferably configured to particularly accommodate a specific maximum number of passengers under ideal, safety conditions.

The seat pan support assembly 20 of the present invention generally includes a front end 22, a rear end 24, a first side 26, and a second side 28. Along these lines, it bears noting that when reference is made to the front end 22 and rear end 24 of the seat pan support assembly 20, and indeed the front and rear of the divan assembly 10 itself, such a designation of front and rear typically has no relation to what is designated the front and rear of the aircraft since the divan assembly 10 is preferably positioned in a generally side facing orientation. Likewise, the first and second sides of the seat pan support assembly 20 can be either a left or right side of the divan assembly 10 depending upon an observer's perspective and its position within the aircraft.

The various portions of the seat pan support assembly 20 are preferably defined by generally rigid tubular elements, secured with one another in a conventional fashion to define a strong, generally rigid structure capable of supporting at least a corresponding number of passengers. Furthermore, a seat pan type structure is also preferably suspended on the tubular elements so as to accommodate padding, upholstery and the like, thereby defining a comfortable, attractive seating area at each of the passenger seating zones 30 and 32. Also in the illustrating embodiment, at least one, but preferably a pair of arm rests 36 are preferably disposed at the opposite sides 26, 28 of the seat pan support assembly 20. The arm rests 36, which may be secured to the seat pan support assembly 20, but are preferably independently secured to the aircraft, extend generally upwardly in a conventional fashion so as to provide additional comfort to a passenger utilizing the divan assembly 10. Moreover, in the illustrated embodiment the arm rests 36 will generally border the passenger seating zones 30, 32 to define an overall seating area and generally provide resistance to movement by a passenger seated within a corresponding passenger seating zones 30, 32 off of the divan assembly 10 when a longitudinally directed force is applied to the divan assembly 10.

Looking to the illustrating embodiment of the present invention, a two passenger divan assembly 10 is defined. In this illustrated, two passenger embodiment, the seat pan support assembly 20, as defined by the passenger seating zones 30, 32, is preferably at least generally about 53 inches wide from the first side 26 to the second side 28. As a result, during an FAA longitudinal impact test procedure there will be only incidental contact, if any, between passengers seated within the adjacent passenger zones 30, 32, thereby passing the necessary test criteria. Furthermore, in the preferred, illustrated embodiment, the dimension of the seat pan support assembly 20 can also be identified as a spacing of at least generally about 27 inches between the mid points 31 and 33 of adjacent passenger seating zones 30, 32. As a result, if the multi-passenger divan assembly 10 of the present invention is configured to accommodate more than two passengers, the spacing between each adjacent pair of passenger seating zones would also preferably be generally about 27 inches from mid point to mid point. Of course, it is understood that although a substantial increase in width is not preferred, based upon the size and weight considerations of the aircraft and the need to pass the pitch and roll test procedures to be described, an increased width seat pan support assembly 20 could be defined, if desired, while maintaining the same number of passenger seating zones. The increased width and/or spacing would, naturally, further avoid passenger to passenger contact upon the application of a longitudinal impact force to the divan assembly 10. Moreover, with regard to the recited and preferred spacing and sizing of the seat pan support assembly 20, it is also recognized that in some alternative embodiments, and/or embodiments which do not include arm rests and/or wherein the longitudinal impact test is not as great a concern, the recited dimensions may ultimately be modified to reflect changes in the structure of the divan assembly 10 beyond what is to be defined with reference to the illustrated embodiment.

Operatively coupled to the seat pan support assembly 20 is preferably a seat back assembly 40. In particular, the seat back assembly 40 is preferably secured in a generally vertical orientation relative to the seat pan support assembly 20. Of course, in alternate embodiments a slightly more angled orientation can be achieved, and in either configuration a convertible type structure wherein the seat back assembly 40 may be lowered or reclined so as to define a more planar sleeping surface may also be integrated within the divan assembly 10 of the present invention. Looking in detail, however, to the illustrated seat back assembly 40 of the present invention, it preferably extends at least generally about 23 inches above the seat pan support assembly 20, at least within the two passenger configuration. This illustrated configuration of the seat back assembly 40 preferably provides an increased area of contact between the seat back assembly 40 and the passengers seated within the passenger seating zones 30, 32 than is normally achieved in conventional divan assemblies. Accordingly, the seat back assembly 40, usually in connection with the restraint assemblies to be described, also helps the divan assembly 10 of the present invention pass the longitudinal impact test procedure by frictionally engaging the passengers and reducing their tendency to slide towards one another during the application of a longitudinally directed force on the divan assembly 10. Along these lines, a reduced height seat back assembly 40 may, in some cases, necessitate a wider seat pan support assembly 20, and visa versa.

Operatively associated, preferably at least with the seat back assembly 40, are one or more restraint assemblies. The restraint assemblies preferably include a seat belt or harness type structure secured to the divan assembly and positioned to correspond to each passenger to be accommodated by the divan assembly 10. Moreover, in the preferred embodiment, the restraint assemblies preferably extend from the seat back assembly 40 towards the seat pan support assembly 20 so as to provide a generally over the shoulder type of restraint. The preferred restraint assemblies that may be provided with the present invention typically include a mount bracket 42, said mount bracket including a guide angle 42A, as seen in FIG. 1, which directs the passage of a belt or strapping, such as from an inertia reel, over the passenger. In the illustrated embodiment, the mount brackets 42 of the restraint assemblies are preferably secured generally at an upper portion of the seat back assembly 40, and generally correspond a mid point 31, 33, including a point slightly forward thereof, of a corresponding one of the passenger seating zones 30, 32, so as to accommodate passage over a forward shoulder. As a result, regardless of the direction from which a longitudinally directed impact force is applied to the divan assembly 10, a passenger seated within one of the corresponding passenger seating zones 30, 32 will tend to be maintained at or towards the mid point 31, 33 by the restraint assembly, and passenger to passenger contact is further minimized. Accordingly, the positioning and orientation of the restraint assemblies, along with the above-referenced, preferred spacing between the mid points 31, 33 of the adjacent passenger seating zones 30, 32, and preferred height of the seat back assembly 40, work together so as to reduce an overall movement of passengers towards one another during a longitudinal impact test procedure. Also from the preceding, however, it is recognized that modifications in the position of the restraints and/or the dimension of the seat back assembly 40 can also impact the preferred spacing between the passenger seating zones 30, 32. Of course, weight and size considerations associated with aircraft installations, as well as the requirements associated with the pitch and roll deformation test procedures to be defined, make it preferable that a minimum width for the seat pan support assembly 20 be generally achieved, while still meeting the required test criteria.

Extending generally downwardly from the seat pan support assembly 20 is a base assembly, generally 50. The base assembly 50 is structured to securely engage the underlying support surface of the aircraft, and as previously recited, the seating tracks 53 secured to the underlying support surface. In the illustrated embodiment of FIG. 1, the base assembly 50 preferably includes at least two forward support members and a plurality of rear support members, positioned so as to effectively secure the divan assembly 10 to the aircraft, providing a required degree of rigidity and stability thereto. Preferably disposed a spaced apart distance from one another at generally the first side 26 of the seat pan support assembly 20, and extending generally downwardly therefrom, are a first forward support member 54 and a first rear support member 56. Likewise, preferably positioned a spaced apart distance from one another at generally the second side 28 of the seat pan support assembly 20 are a second forward support member 54' and a second rear support member 56'. In this regard, it is recognized that although not absolutely necessary, it is preferred that generally corresponding, matching structures for the base assembly 50 he defined at the first and second sides of the seat pan support assembly 20. This is especially beneficial in light of the fact that conventional FAA testing will typically place the weakest side of the divan assembly 10 in a position of maximum stress, thereby making it preferable that both sides be equally capable of meeting the required test criteria. Accordingly, for purposes of clarity, the following discussion will reference only one side of the divan assembly 10.

As best seen in FIGS. 2 through 4, the forward and rear support members 54, 56 are preferably disposed a generally spaced apart distance from one another at a corresponding side 26 of the seat pan support assembly 20. Moreover, the forward and rear support members 54, 56 preferably comprise generally rigid structures which can be bolted or otherwise secured to the seating track 53 and/or the seat pan support assembly 20 by variety of conventional means, including screws, bolts, straps, clamps, clips, rivets and the like, at a rigid and/or flexible joint. Extending generally between the forward support member 54 and the rear support member 56 is preferably a cross support assembly 60. As can be seen from the illustrations, a first cross support assembly 60 is preferably positioned at the first side 26 of the seat pan support assembly 20 between the first forward support member 54 and the first rear support member 56, while a preferably corresponding second cross support assembly 60' shown in FIG. 1 is disposed generally at the second side 28 of the seat pan support assembly 20 between the second forward support member 54' and the second rear support member 56'.

The cross support assembly 60 extends preferably in an angular orientation generally between the forward and rear support members 54, 56, and as illustrated in FIGS. 2–4, is preferably secured generally at the forward and rear support members 54, 56 at corresponding fastener ends 64, 69 thereof. In this regard, it is also recognized that the cross support assembly 60 may be directly or indirectly secured to the corresponding support members 54, 56 by any of the variety of acceptable and conventional means, including rivets, welds, clips, clamps, straps, bolts, etc., in a fixed or pivotal orientation. Moreover, the corresponding fastener end 64 of the cross support assembly 60 may be directly secured to the seat pan support assembly 20, while still exhibiting the general characteristics to be described herein with regard to the relative disposition of the forward and rear support assemblies.

Looking in further detail to the cross support assembly 60 of the present invention, it is preferably structured and disposed to generally resist compression of the forward and rear support members 54, 56 towards one another, as best depicted in FIG. 3, thereby providing strength to the overall divan assembly 10. In this regard, it is recognized that the fastener end 64 of the cross support assembly 60 can be secured to the corresponding support member and/or directly to the seat pan support assembly 20, with such configurations being considered as defining equivalent structures for the extension of the cross support assembly 60 between the forward and rear support members 54, 56. In either configuration a general support and/or reinforcement is achieved when a corresponding side of the divan assembly 10 is subjected to a generally compressive force, such as during the pitch and roll deformation test. Furthermore, the recited angular orientation can extend from an upper portion of the front or rear support members towards a lower portion of the opposite support member.

In addition to resisting the general compression of the forward and rear support members 54, 56 towards one another, the cross support assembly 60 is further structured to permit and achieve generally free expansion when, as illustrated in FIG. 4, a general expansion between the forward and rear support members 54, 56 takes place, such as during the pitch and roll deformation test. As a result, under such conditions of expansive load, the cross support assembly 60 does not have to bear the entire load, and the likelihood that it or another portion of the divan assembly 10 will yield when subjected to a large degree expansion is reduced.

Before looking in further detail to the base assembly 50, and in particular the preferred configuration of the cross support assembly 60, a description of the typical FAA pitch and roll deformation test procedure to which the divan assembly 10 will be subjected is beneficial. Specifically, the pitch and roll test can be directed from either side of the divan assembly 10, and generally provides that the front end of the divan assembly 10 will be subjected to a 10 degree pitch, as depicted by arrow P in FIG. 1. As a result, one side of the divan assembly 10, preferably at a corresponding forward support member, is lowered relative to the forward support member at the opposite side of the divan assembly 10, based upon the 10 degree pitch angle. As can be appreciated, in a narrow, single person divan assembly, a 10 degree pitch angle does not result in a large relative deflection between the opposite sides of the divan assembly. In the illustrated divan assembly 10, however, because of its wider, multi-passenger configuration, the 10 degree pitch angle results in a substantial amount of relative deflection between the opposite sides of the divan assembly 10. Of course, in addition to the pitch component of the test procedure, at least one of the rear support members of the divan assembly 10 is subjected to a 10 degree roll, preferably directed towards the rear of the divan assembly 10, as depicted by arrow R in FIG. 1. As a result, the roll further contributes to compression at one side of the divan assembly 10 and expansion on the opposite side of the divan assembly 10. Indeed, during a traditional pitch and roll deformation test, one side of the divan assembly 10, as in FIG. 3 is generally compressed, while the opposite side of the divan assembly, as in FIG. 4, is substantially expanded.

In light of the preceding, the cross support assembly 60 of the present invention is particularly configured such that when a general state of compression is being exhibited, as in FIG. 3, the cross support assembly 60 functions to resist that compression and provide reinforcement and support for the divan assembly 10 to prevent buckling and/or deformation of either the base assembly 50 and/or the seat pan support assembly 20. That same cross support 60, however, also permits free expansion when expansion characteristics are exhibited, as in FIG. 4. As a result, regardless of a side relative to which the pitch and roll deformation test is applied, the responsive configuration of the cross support assembly 60 enables the divan assembly 10 of the present invention to meet the required test criteria even in a larger, multi-passenger configuration.

Turning once again to FIGS. 2 through 4, as indicated, the cross support assembly 60 of the present invention is preferably angularly oriented, extending from the seat pan support assembly 20, at generally an upper end of the rear support member 56, towards generally a lower end of the forward support member 54. Furthermore, in the preferred, illustrated embodiment, the cross support assembly 60 includes at least a first segment 62 and a second segment 66 movably disposed relative to one another. The first and second segments 62 and 66 are preferably configured to generally abut one another under compressive forces, while also to freely expand relative to one another under expansive type forces. For purposes of clarity, the compression can generally be described by a tendency to reduce the relative spacing between the fastener end 64 of the first segment 62 from the fastener end 69 of the second segment 66. In the illustrating embodiments, defined in the first and second segments 62 and 66 are an elongate slot 67 and a pin element 63. Although it is understood that the ultimate location of the elongate slot 67 and/or the pin element 63 can be interchangeable, in the illustrated embodiment the elongate slot 67 is disposed in the second segment 66, while the pin element 63 is generally associated with the first segment 62. Likewise, a configuration wherein the first segment 62 is received in sandwiched relation within the second segment 66 is also contemplated, with one or more elongate slots 67 being defined on one or both sides of the second segment 66, as completely open and/or indented structures. As a result of the preceding structure, the pin element 63 is configured to generally ride within the elongate slot 67 under the forces of compression or expansion experienced by the divan assembly 10, and among other characteristics, keeps the segments from spreading. Also in the illustrated embodiment, and as best seen in FIG. 2, the pin element 63 is preferably disposed a slightly spaced apart distance from an end 68 of the slot 67 in a normal, at rest configuration of the divan assembly 10. Accordingly, when the compressive forces are exhibited, as in FIG. 3, the pin element 63 will slide a relatively short distance, if any, and the first and second segments will abut one another providing a bearing surface for the support and reinforcement necessary. Moreover, by allowing a certain degree of movement, even under compression, a certain amount of the forces of compression are already dissipated throughout the divan assembly 10 before being affirmatively resisted by the engagement of first and second segments 62, 66. Conversely, and as best seen in FIG. 4, when forces of expansion are exerted, the pin element 63 freely rides within the elongate slot 67, even to the point of allowing generally pivotal movement between the first and second segments 62, 66, as shown in FIG. 4. Accordingly, even under circumstances of substantial expansion due to the 10 degree pitch, the generally free expansion ensures that the cross support assembly 60 is not required to resist the full expansion by itself and is not damaging to the divan assembly 10. Also with regard to the elongate slot 67, it is understood, that in the illustrated embodiment the elongate slot 67 will ultimately provide a limit to the expansion, however, such a limit can be varied and may not be necessary in all situations, as it is preferably never reached. Further, the free movement of the pin element within the elongate slot 67 can also be moderately resisted so as to generally limit minor expansion.

Lastly, with reference once again to FIG. 1, the base assembly 50 also preferably includes an intermediary rear support member 57 positioned a preferably spaced apart distance from both the first and second rear support members 56, 56'. Although it is understood that multiple intermediate support members 57 may be provided, in the illustrated two passenger configuration, a single intermediary support member 57 is preferably disposed at generally a rear end of the divan assembly 10 so as to provide central reinforcement to the divan assembly 10, and in particular the seat pan support assembly 20. Moreover, extending preferably from the intermediary rear support member 57 towards an adjacent intermediary rear support member and/or a correspondingly positioned first or second rear support member 56, 56', is preferably at least one rear cross element 58. The rear cross element 58 may include a configuration similar to that of the cross support assembly 60, or, as in the illustrated embodiment may be generally rigid so as to provide additional enforcement.

Based upon the overall configuration of the base assembly 50, as previously defined with regard to the illustrated embodiment of FIG. 1, a generally open area 52 is defined within the base assembly 50, beneath the seat pan support assembly 20. This open area 52 is preferably not constrained at a front end of the divan assembly, and as a result is structured to accommodate a large safety article, such as a life raft 75, therein. As a result, such a configuration is particularly beneficial within smaller aircraft wherein it is desirable to include one or more life rafts 75, but space constraints associated with the need for a single large area to accommodate the entire life raft 75 often make it impractical.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. For an aircraft, a side facing, multi-passenger divan assembly comprising:
   a seat pan support assembly, said seat pan support assembly including a front end, a rear end, a first side and a second side;
   seat back assembly operatively coupled to said seat pan support assembly;
   a base assembly extending downwardly from said seat pan support assembly into secure engagement with an underlying support surface of the aircraft;
   said base assembly including at least a first forward support member and a first rear support member extending downwardly from said seat pan support assembly, in generally spaced apart relation from one another, at generally said first side thereof,
   at least a first cross support assembly extending generally from said first forward support member to said first rear support member;
   said first cross support member comprising a first segment and a second segment, the first segment having a point of attachment to the forward support member, the second segment having a point of attachment to the rear support member, the second segment movably disposed with respect to the first segment such that the first cross support member resists compression when the second segment abuts the first segment at the point of attachment of the first segment to the forward support member and such that the first and second segments are free to move in tension.

2. A side facing, multi-passenger divan assembly as recited in claim 1 wherein said first cross support assembly extends generally angularly between said first forward support member and said first rear support member.

3. A side facing, multi-passenger divan assembly as recited in claim 2 wherein said first cross support assembly extends from said seat pan support assembly at generally an upper end of said first rear support member towards generally a lower end of said first forward support member.

4. A side facing, multi-passenger divan assembly as recited in claim 1 wherein said second segment includes an elongate slot defined therein and said first segment includes a pin element structured to extend through said elongate slot so as to slidably couple said second segment to said first segment and permit relative movement therebetween.

5. A side facing, multi-passenger divan assembly as recited in claim 4 wherein said elongate slot and said pin element are structured and disposed relative to one another so as to permit said first and said second segments to abut one another upon compression of said first forward support member and said first rear support member towards one another, thereby resisting said compression.

6. A side facing, multi-passenger divan assembly as recited in claim 5 wherein said elongate slot and said pin element are structured and disposed relative to one another such that said pin element slides within said elongate slot upon expansion of said first forward support member and said first rear support member away from one another, thereby permitting said expansion.

7. A side facing, multi-passenger divan assembly as recited in claim 1 wherein said second segment has a free end which is separated a distance from the point of attachment of the first segment to the forward support member such that the free end abuts the first segment at the point of attachment under a compressive load.

8. A side facing, multi-passenger divan assembly as recited in claim 1 wherein said base assembly further comprises at least a second forward support member and a second rear support member extending downwardly from said seat pan support assembly, in generally spaced apart relation from one another, at generally said second side thereof.

9. A side facing, multi-passenger divan assembly as recited in claim 8 further comprising:
   a second cross support assembly extending generally from said second forward support member to said second rear support member;
   said second cross support member comprising a first segment and a second segment, the first segment having a point of attachment to the forward support member, the second segment having a point of attachment to the rear support member, the second segment movably disposed with respect to the first segment such that the second cross support member resists compression when the second segment abuts the first segment at the point of attachment of the first segment to the forward support member and such that the first and second segments are free to move in tension.

10. A side facing, multi-passenger divan assembly as recited in claim 9 wherein said base assembly further comprises at least one intermediary rear support member extending downwardly from said seat pan support assembly, at generally said rear end thereof, so as to maintain a generally open area beneath said seat pan support assembly generally between said first and said second forward and rear support members, said generally open area structured to receive at least one safety article therein.

11. A side facing, multi-passenger divan assembly as recited in claim 10 wherein said safety article comprises a life raft.

12. A side facing, multi-passenger divan assembly as recited in claim 10 further comprising at least two rear cross elements extending generally from said first and said second rear support members to said intermediary rear support member.

13. A side facing, multi-passenger divan assembly as recited in claim 1 further comprising at least one arm rest disposed at least one end of said seat pan support assembly.

14. A side facing, multi-passenger divan assembly as recited in claim 13 wherein said seat pan support assembly includes a two passenger configuration structured to be at least generally about 53 inches wide.

15. A side facing, multi-passenger divan assembly as recited in claim 14 wherein said seat back assembly extends at least generally about 23 inches above said seat pan support assembly.

16. A side facing, multi-passenger divan assembly as recited in claim 15 further comprising at least two restraint assemblies extending from said seat back assembly towards said seat pan support assembly, each of said restraint assemblies extending from said seat back assembly at a point generally near mid point of a corresponding passenger seating zone defined on said seat pan support assembly.

17. A side facing, multi-passenger divan assembly as recited in claim 1 wherein said seat pan support assembly defines at least two passenger seating zones.

18. A side facing, multi-passenger divan assembly as recited in claim 17 wherein mid points of adjacent ones of said passenger seating zones are spaced generally at least about 27 inches from one another so as to prevent hazardous contact between passengers disposed in adjacent ones of said passenger seating zones during a longitudinally directed impact on the divan assembly.

19. For installation in an aircraft, a side facing, two-passenger divan assembly comprising:
   a seat pan support assembly, said seat pan support assembly including a front end, a rear end, a first side and a second side;
   a seat back assembly operatively coupled to said seat pan support assembly;
   a base assembly extending downwardly from said seat pan support assembly into secure engagement with an underlying support surface of the aircraft;
   said base assembly including at least a first forward support member and a first rear support member extending downwardly from said seat pan support assembly, in generally spaced apart relation from one another, at generally said first side thereof;
   said seat pan support assembly being generally at least about 53 inches wide so as to accommodate two adjacent passengers and minimize contact between said two adjacent passengers during a longitudinally directed impact on the divan assembly; and
   at least a first cross support assembly extending generally from said first forward support member to said first rear support member;
   said first cross support member comprising a first segment and a second segment, the first segment having a point of attachment to the forward support member, the second segment having a point of attachment to the rear support member, the second segment movably disposed with respect to the first segment such that the first cross support member resists compression when the second segment abuts the first segment at the point of attachment of the first segment to the forward support member and such that the first and second segments are free to move in tension.

20. A side facing, two passenger divan assembly as recited in claim 19 wherein said seat back assembly extends at least generally about 23 inches above said seat pan support assembly.

21. A side facing, two passenger divan assembly as recited in claim 20 wherein said seat pan support assembly defines two passenger seating zones.

22. A side facing, two passenger divan assembly as recited in claim 21 further comprising at least two restraint assemblies extending from generally an upper portion of said seat back assembly towards said seat pan support assembly at generally a mid point of a corresponding one of said passenger seating zones.

23. A side facing, two passenger divan assembly as recited in claim 20 further comprising at least one arm rest disposed at least one end of said seat pan support assembly.

24. A side facing, two-passenger divan assembly as recited in claim 19 wherein said base assembly further comprises:
   a second cross support assembly extending generally from said second forward support member to said second rear support member;
   said second cross support member comprising a first segment and a second segment, the first segment having a point of attachment to the forward support member, the second segment having a point of attachment to the rear support member, the second segment movably disposed with respect to the first segment such that the second cross support member resists compression when the second segment abuts the first segment at the point of attachment of the first segment to the forward support member and such that the first and second segments are free to move in tension.

25. A side facing, two passenger divan assembly as recited in claim 19 wherein said second segment includes an elongate slot defined therein and said first segment includes a pin element structured to extend through said elongate slot so as to slideably couple said second segment to said first segment and permit relative movement therebetween.

26. A side facing, two passenger divan assembly as recited in claim 25 wherein said elongate slot and said pin element are structured and disposed relative to one another so as to permit said first and said second segments to abut one another upon compression of said first forward support member and said first rear support member towards one another, and said second forward support member and said second rear support member towards one another, thereby resisting said compression.

27. A side facing, two passenger divan assembly as recited in claim 26 wherein said elongate slot and said pin element are structured and disposed relative to one another such that said pin element slides within said elongate slot upon expansion of said first forward support member and said first rear support member away from one another, and said second forward support member and said second rear support member away from one another, thereby permitting said expansion.

28. For installation in an aircraft, a side facing, multi-passenger divan assembly comprising:
   a seat pan support assembly, said seat pan support assembly including a front end, a rear end, a first side and a second side, and defining at least two passenger seating zones;
   a seat back assembly operatively coupled to said seat pan support assembly;
   a base assembly extending downwardly from said seat pan support assembly into secure engagement with an underlying support surface of the aircraft; and
   adjacent ones of said passenger seating zones being spaced generally at least about 27 inches from mid point to mid point so as to prevent hazardous contact between passengers disposed in adjacent ones of said passenger seating zones during a longitudinally directed impact on the divan assembly; and said base assembly including at least a first forward support member and a first rear support member extending downwardly from said seat pan support assembly, in generally spaced apart relation from one another, at generally said first side thereof; and at least a first cross support assembly extending generally from said first forward support member to said first rear support member;

said first cross support member comprising a first segment and a second segment, the first segment having a point of attachment to the forward support member, the second segment having a point of attachment to the rear support member, the second segment movably disposed with respect to the first segment such that the first cross support member resists compression when the second segment abuts the first segment at the point of attachment of the first segment to the forward support member and such that the first and second segments are free to move in tension.

29. A side facing, multi-passenger divan assembly as recited in claim 28 wherein said seat back assembly extends at least generally about 23 inches above said seat pan support assembly.

* * * * *